(12) United States Patent
Xie et al.

(10) Patent No.: US 10,383,186 B2
(45) Date of Patent: Aug. 13, 2019

(54) LOAD TRANSIENT RESPONSE CONTROL SYSTEMS AND METHODS FOR ELECTRONIC DEVICE DISPLAYS

(71) Applicant: Apple Inc., Cupertino, CA (US)

(72) Inventors: Yanhui Xie, Santa Clara, CA (US); Asif Hussain, San Jose, CA (US); Ji Yeoul Ryoo, Cupertino, CA (US); Jingdong Chen, San Jose, CA (US); Mohammad J. Navabi-Shirazi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/785,082

(22) Filed: Oct. 16, 2017

(65) Prior Publication Data

US 2019/0053337 A1     Feb. 14, 2019

Related U.S. Application Data

(60) Provisional application No. 62/543,773, filed on Aug. 10, 2017.

(51) Int. Cl.
*H05B 33/08* (2006.01)
*G02F 1/13357* (2006.01)
*G02F 1/1335* (2006.01)

(52) U.S. Cl.
CPC ......... *H05B 33/083* (2013.01); *G02F 1/1336* (2013.01); *H05B 33/0812* (2013.01); *H05B 33/0815* (2013.01); *H05B 33/0845* (2013.01); *G02F 2001/133601* (2013.01)

(58) Field of Classification Search
CPC ............ H05B 33/0812; H05B 33/0815; H05B 33/0845
USPC .................................................. 315/192, 193
See application file for complete search history.

(56) References Cited

U.S. PATENT DOCUMENTS

| | | | |
|---|---|---|---|
| 8,183,847 B2 | 5/2012 | Capilla | |
| 9,608,513 B2 | 3/2017 | Reddy | |
| 2010/0327772 A1* | 12/2010 | Lee | H05B 33/0818 315/297 |
| 2011/0148323 A1* | 6/2011 | Yao | H05B 33/0827 315/295 |
| 2012/0074856 A1* | 3/2012 | Takata | H05B 33/0815 315/192 |
| 2017/0018230 A1* | 1/2017 | Im | G09G 3/342 |
| 2017/0077812 A1 | 3/2017 | Guo | |
| 2019/0081565 A1* | 3/2019 | Jans | H02M 1/4241 |

* cited by examiner

*Primary Examiner* — Tung X Le
(74) *Attorney, Agent, or Firm* — Jaffery Watson Mendonsa & Hamilton LLP

(57) ABSTRACT

Aspects of the subject technology relate to control circuitry for light-emitting diodes. The control circuitry may include a feedforward loop and a feedback loop for a power supply for the light-emitting diodes. The light-emitting diodes may be arranged in strings that are individually controllable by a current control transistor on the string. The feedforward loop may determine a total upcoming load current for the power supply based on reference voltages for controlling each of the current control transistors. The output of the power supply may be modified based on a combination of a current from the feedforward loop and a current from the feedback loop.

21 Claims, 6 Drawing Sheets ical field

The present description relates generally to electronic devices with displays, and more particularly, but not exclusively, to power supplies for electronic device displays.

BACKGROUND

Electronic devices such as computers, media players, cellular telephones, set-top boxes, and other electronic equipment are often provided with displays for displaying visual information. Displays such as organic light-emitting diode (OLED) displays and liquid crystal displays (LCDs) typically include an array of display pixels arranged in pixel rows and pixel columns. Liquid crystal displays commonly include a backlight unit and a liquid crystal display unit with individually controllable liquid crystal display pixels.

The backlight unit commonly includes one or more light-emitting diodes (LEDs) that generate light that exits the backlight toward the liquid crystal display unit. The liquid crystal display pixels are individually operable to control passage of light from the backlight unit through that pixel to display content such as text, images, video, or other content on the display.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
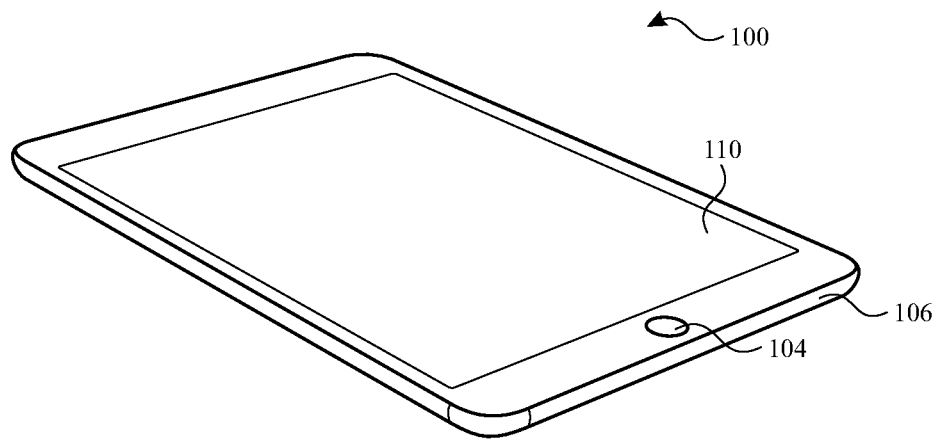
FIG. 1 illustrates a perspective view of an example electronic device having a display in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides electronic devices such as cellular telephones, media players, tablet computers, laptop computers, set-top boxes, smart watches, wireless access points, and other electronic equipment that include light-emitting diode arrays such as in backlight units of displays. Displays are used to present visual information and status data and/or may be used to gather user input data. A display includes an array of display pixels. Each display pixel may include one or more colored subpixels for displaying color images.

Each display pixel may include a layer of liquid crystals disposed between a pair of electrodes operable to control the orientation of the liquid crystals. Controlling the orientation of the liquid crystals controls the polarization of backlight from a backlight unit of the display. This polarization control, in combination with polarizers on opposing sides of the liquid crystal layer, allows light passing into the pixel to be manipulated to selectively block the light or allow the light to pass through the pixel.

The backlight unit includes one or more light-emitting diodes (LEDs) such as one or more strings and/or arrays of light-emitting diodes that generate the backlight for the display. In various configurations, strings of light-emitting diodes may be arranged along one or more edges of a light guide plate that distributes backlight generated by the strings to the LCD unit, or may be arranged to form a two-dimensional array of LEDs.

Although examples discussed herein describe LEDs included in display backlights, it should be appreciated that the LED control circuitry and methods described herein can be applied to LEDs implemented in other devices or portions of a device (e.g., in a backlit keyboard or a flash device).

Backlight control circuitry includes a power supply, such as a direct-current/direct-current (DC/DC) power converter. The power supply provides a common supply voltage to multiple parallel strings of light-emitting diodes (LEDs). Current through each string is controlled using a current driver for that string. Each current driver is operated based on a corresponding applied reference voltage. The reference voltage for each string may be based on display content to be displayed using the LCD unit, to provide content-based local dimming of the backlight. The reference voltages for each string are known before they are applied to the LED strings.

In accordance with various aspects of the subject disclosure, the backlight circuitry includes a feedforward loop, in which the known reference voltages are fed forward to load transient response circuitry for the power supply. The load transient response circuitry determines a total upcoming load current for the power supply. The total load current is combined with a feedback current for the power supply to reduce the load transient response during a power supply response to a change in current load.

In accordance with various aspects, backlight control circuitry having a DC/DC converter with a feedback loop and a feedforward loop is disclosed. In accordance with various aspects, a feedforward loop for a DC/DC converter, in which known reference voltages for controlling the current through each of multiple LED strings are used to control the supply voltage from the DC/DC converter, is provided. In accordance with various aspects, a method is provided that includes determining a load current for a power supply based on multiple reference voltages, each corresponding a string of backlight LEDs.

An illustrative electronic device having light-emitting diodes is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone). As shown in FIG. 1, device 100 may include a display such as display 110 mounted on the front of housing 106. Display 110 may be substantially filled with active display pixels or may have an active portion and an inactive portion. Display 110 may have openings (e.g., openings in the inactive or active portions of display 110) such as an opening to accommodate button 104 and/or other openings such as an opening to accommodate a speaker, a light source, or a camera.

Display 110 may be a touch screen that incorporates capacitive touch electrodes or other touch sensor components or may be a display that is not touch-sensitive. Display 110 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using LCD pixels and LED backlights are sometimes described herein as an example. This is, however, merely illustrative. In various implementations, any suitable type of display technology may be used in forming display 110 if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a wrist-watch device, a pendant device, or other wearable or miniature device, a media player, a gaming device, a navigation device, a computer monitor, a television, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations. An LED backlight array may also be provided for the keyboard and/or other illuminated portions of device 100.

In some implementations, electronic device 100 may be provided in the form of a computer integrated into a computer monitor. Display 110 may be mounted on a front surface of housing 106 and a stand may be provided to support housing (e.g., on a desktop).

Figure 2:
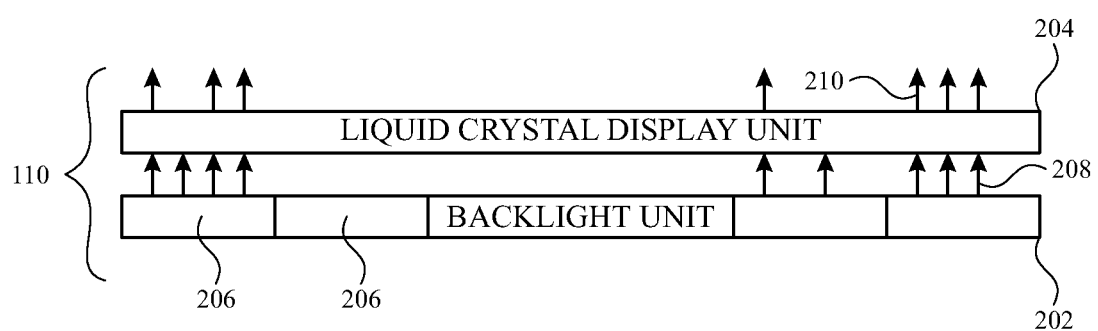
FIG. 2 illustrates a block diagram of a side view of an electronic device display having a backlight unit in accordance with various aspects of the subject technology.

FIG. 2 is a schematic diagram of display 110 in which the display is provided with a liquid crystal display unit 204 and a backlight unit 202. As shown in FIG. 2, backlight unit 202 generates backlight 208 and emits backlight 208 in the direction of liquid crystal display unit 204. Liquid crystal display unit 204 selectively allows some or all of the backlight 208 to pass through the liquid crystal display pixels therein to generate display light 210 visible to a user. Backlight unit 202 includes one or more subsections 206.

In some implementations, subsections 206 may be elongated subsections that extend horizontally or vertically across some or all of display 110 (e.g., in an edge-lit configuration for backlight unit 202). In other implementations, subsections 206 may be square or other rectilinear subsections (e.g., subarrays of a two-dimensional LED array backlight). Accordingly, subsections 206 may be defined by one or more strings and/or arrays of LEDs disposed in that subsection. Subsections 206 may be controlled individually for local dimming of backlight 208.

Although backlight unit 202 is shown implemented with a liquid crystal display unit, it should be appreciated that a backlight unit such as backlight unit 202 may be implemented in a backlit keyboard, or to illuminate a flash device or otherwise provide illumination for an electronic device.

Figure 3:
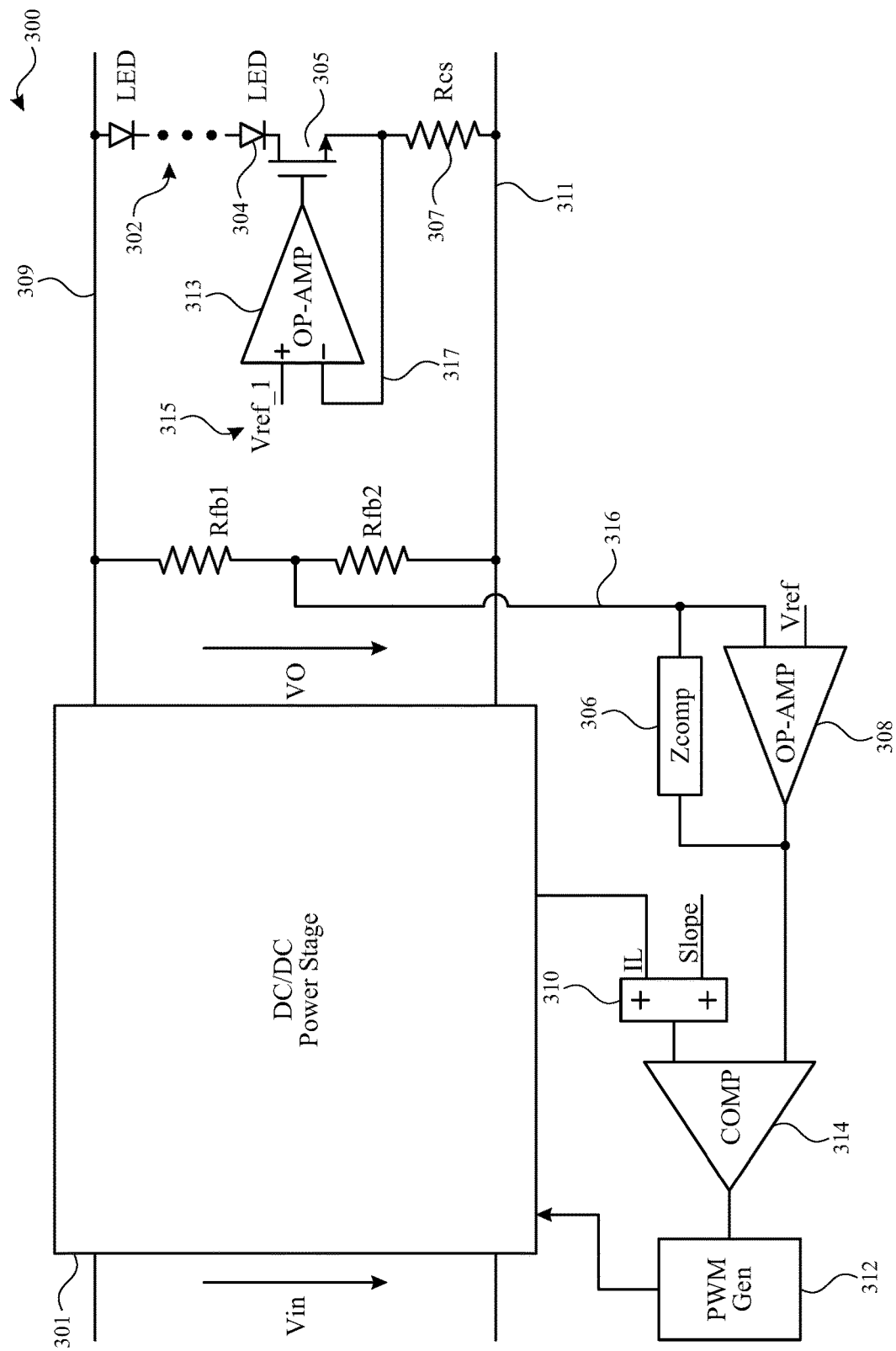
FIG. 3 illustrates a schematic diagram of light-emitting diode (LED) control circuitry having supply voltage feedback loop in accordance with various aspects of the subject technology.

FIG. 3 shows a schematic diagram of exemplary LED circuitry such as backlight circuitry for display 110. For example, LED circuitry 300 of FIG. 3 may be implemented in backlight unit 202 or other LED lighting devices. In the example of FIG. 3, circuitry 300 includes at least one string 302 of LEDs 304 (e.g., strings of one or more series-coupled LEDs) and associated control circuitry for controlling the brightness of the LEDs in each string 302.

In the example of FIG. 3, circuitry 300 includes power supply 301 for providing a supply voltage to a first end of strings 302 along a supply voltage rail 309. Each string 302 includes current control circuitry coupled between a last LED 304 in that string and a ground voltage supply rail 311. The current control circuitry includes a current control transistor 305 having a first source/drain terminal coupled to the last LED 304 in the string and a second source/drain terminal coupled to the ground voltage rail 311 via a resistor 307. Current control transistor 305 includes a gate terminal, and is operable to control the current through string 302 based on a reference voltage 315 applied to the gate terminal. In the example of FIG. 3, the reference voltage 315 for the depicted string 302 is labeled Vref_1. Each string 302 receives an individual reference voltage 315.

As shown in FIG. 3, an operational amplifier 313 may be coupled between a supply line for reference voltage 315 (e.g., a supply line from a digital-to-analog converter) and the gate terminal of transistor 305 to provide feedback control of the current through transistor 305. A first input terminal of amplifier 313 receives reference voltage 315 and a second input terminal of amplifier 313 receives a residual voltage from sampling line 317 for comparison, by amplifier 313 to the reference voltage. Amplifier 313 includes an output terminal coupled to the gate terminal of transistor 305 and adjusts the voltage applied to the gate terminal of transistor 305 to match the feedback voltage to the reference voltage for that string. As shown, the feedback voltage is a residual voltage at an end of LED string 302 (e.g., a residual voltage at a location between transistor 305 and resistor 307).

Power supply 301 maintains the supply voltage on rail 309 using a feedback loop fed by sampling line 316, which samples the output voltage of power supply 301. During operation, the output voltage (e.g., Vo) of power supply 301 is sensed by sampling line 316. The sensed output voltage is compared, by operational amplifier 308, with a reference supply voltage Vref (e.g., a global reference voltage for the supply voltage from power supply 301) and the result of the comparison (e.g., the error in the output voltage) is amplified and compensated to determine an inductor peak feedback current for power supply 301. Comparator 314 compares the inductor peak feedback current from amplifier 308 with the inductor current IL for power supply 301 (e.g., a peak current of the inductor of power supply 301) and provides a difference value or correction value to pulse-width modulation (PWM) generator 312 based on the comparison.

PWM generator modifies a PWM signal to power supply 301 to modify the output of power supply 301 based on the difference value (e.g., the difference between the inductor peak feedback current and the target current IL). Modifying a duty cycle of the PWM signal generates modifications to the supply voltage provided by the power supply and corresponding changes to a peak inductor current of an inductor of the power supply. In the example of FIG. 3, sloping circuitry 310 is provided to compensate for the inductor current slope to help ensure inductor stability when the PWM duty cycle is large. Impedance compensation (Zcomp) circuit 306 may also be provided for amplifier 308.

In the example of FIG. 3, the sampled output voltage on sampling line 316 is the only input of the feedback compensation circuitry. However, if there is a load transient caused by changes in the currents through strings 302, the output voltage of power supply 301 changes. Then the feedback compensation circuitry adjusts the peak current of power supply 301 to regulate the output voltage.

During operation, power supply 301, together with the feedback compensation circuitry, maintains the supply voltage on rail 309 and the peak inductor current from power supply 301 sufficiently high to operate all LEDs and maintain a headroom voltage at the end of all of strings 302. The headroom voltage is set to ensure sufficient power to operate all LEDs 304 in all strings 302 at a desired brightness. However, in the arrangement of FIG. 3, as the feedback compensation circuitry modifies the peak inductor current to compensate for changes in the load current, a current undershoot or a current overshoot relative the desired (target) current can occur. Accordingly, relatively a larger headroom voltage may be provided to provide a margin for the current undershoot or overshoot, which can lead to a higher steady state power loss. It is thus desirable, at least from a power saving perspective, to be able to improve the load transient response of power supply 301.

Reference voltages 315 for LED strings 302 are known, in many scenarios, before being applied to control the current through the current control transistors 305 of the strings 302. For example, reference voltages 315 may be obtained by backlight control circuitry (e.g., by translating target LED currents received from a timing controller (TCON) to corresponding LED current sink reference voltages), to individually control the brightness of the LEDs 304 in that string, based on content to be displayed by display 110. In accordance with some aspects of the present disclosure, the known reference voltages are used to determine a total upcoming load current for power supply 301, which can be pre-compensated or compensated in real time to reduce current undershoot or overshoot and improve the load transient response to power supply 301.

Figure 4A:
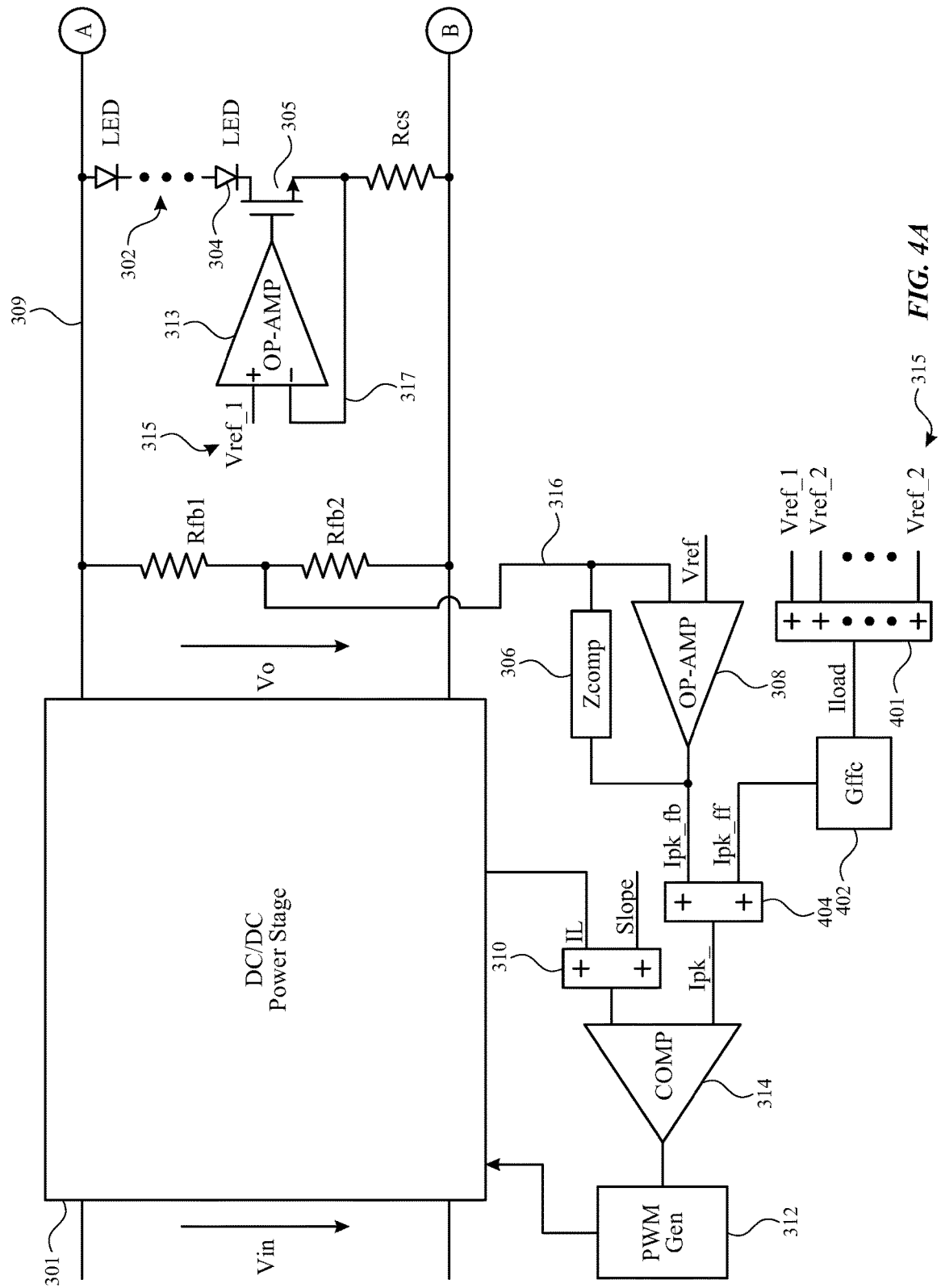
FIGS. 4A and 4B illustrate a schematic diagram of light-emitting diode (LED) control circuitry having supply voltage feedback loop and a load current feedforward loop in accordance with various aspects of the subject technology.
Figure 4B:
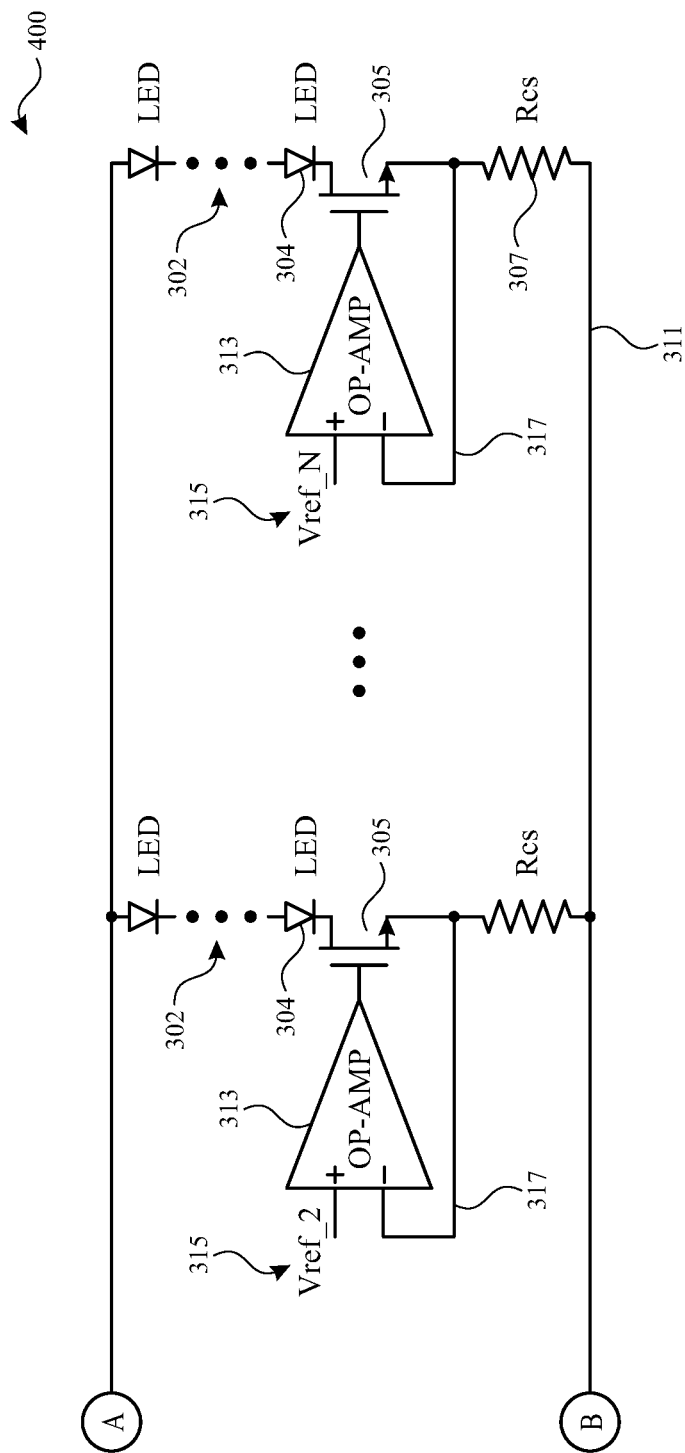

FIGS. 4A and 4B combine to show a schematic diagram of exemplary LED circuitry such as backlight circuitry for display 110 with which the load transient response of power supply 301 can be improved. For example, LED circuitry 400 of FIGS. 4A and 4B may be implemented in backlight unit 202 or other LED lighting devices. In the example of FIG. 3, only one string 302 is depicted. However, it should be appreciated, as shown in FIGS. 4A and 4B, that multiple LED strings 302 can be provided in parallel between supply voltage rail 309 and ground voltage rail 311.

As shown in FIGS. 4A and 4B, each string 302 includes a current control transistor 305 having a gate terminal operable based on a reference voltage 315 (e.g., reference voltages Vref_1, Vref_2 . . . Vref_N) for that string. Reference voltages such as Vref_1, Vref_2 . . . Vref_N of FIG. 5 may be known a priori (e.g., based on content to be displayed).

As shown in FIGS. 4A and 4B, the reference voltages to be applied to transistor 305 (e.g., during an upcoming display frame or set of display frames) may be provided, before or while being applied at strings 302, to a feedforward loop including adder 401. Adder 401 receives and combines all of the reference voltages Vref_1, Vref_2 . . . Vref_N to determine a total upcoming load current $I_{load}$ for power supply 301.

For example, $I_{load}$ may be determined from the reference voltages (e.g., by adder 400) as shown in Equation 1 below:

$$I_{load} = \frac{V_{ref\_1}}{Rcs} + \frac{V_{ref\_2}}{Rcs} + \ldots + \frac{V_{ref\_n}}{Rcs} \quad (1)$$

in which Rcs is the resistance of the resistor between the current control transistor 305 of each string and the ground voltage rail 311, as noted in FIGS. 4A and 4B.

A feedforward current gain, $G_{ffc}$, can be used to map $I_{load}$ to a feedforward peak current Ipk_ff, as shown in Equation 2 below:

$$I_{pk\_ff} = G_{ffc} * I_{load} \quad (2)$$

Adder 404 then combines (e.g., adds) the peak feedforward current Ipk_ff to a peak feedback current, Ipk_fb, (determined as described above in connection with FIG. 3 using sampling line 316, amplifier 308, and Zcomp circuit 306), as shown in Equation 3 below:

$$I_{pk} = I_{pk\_fb} + I_{pk\_ff} \quad (3)$$

to generate a feedforward/feedback peak current, Ipk.

Comparator 314 compares the feedforward/feedback peak current, Ipk, with the inductor current IL for power supply 301 (e.g., the peak current of the inductor of power supply 301) and provides a difference value to pulse-width modulation (PWM) generator 312, based on the comparison.

PWM generator modifies a PWM signal to power supply 301 to modify the output of power supply 301 based on the difference value (e.g., the difference between the feedforward/feedback peak current, Ipk, and the inductor current IL for power supply 301). Modifying the output includes modifying the peak inductor current of power supply 301 based on the feedforward/feedback peak current, Ipk. In the example of FIG. 4A, sloping circuitry 310 is provided, which may help compensate for the inductor current slope to help ensure inductor stability when the PWM duty cycle is large.

Figure 5:
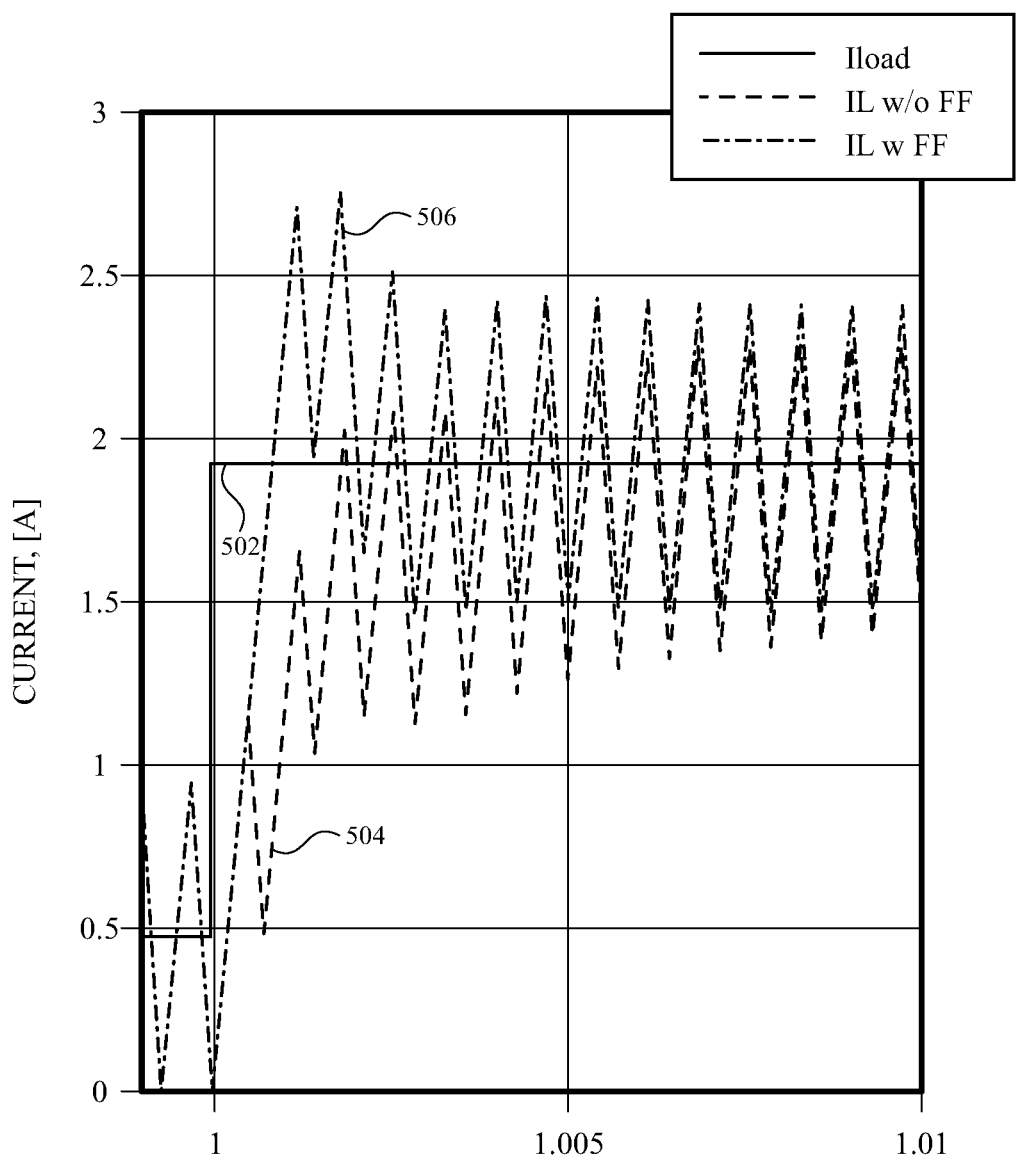
FIG. 5 illustrates a reduction in power supply load transient response facilitated by the control circuitry of FIGS. 4A and 4B in accordance with various aspects of the subject technology.

FIG. 5 illustrates a load transient improvement that may be provided using the LED circuitry of FIGS. 4A and 4B relative to, for example, the circuitry of FIG. 3. As shown in FIG. 5, for an illustrative step in total load current $I_{load}$ (see load current $I_{load}$ curve 502), the inductor current IL recovers faster with the feedforward circuitry of FIGS. 4A and 4B (see, IL w/ FF curve 506) than without the feedforward circuitry of FIGS. 4A and 4B (see IL w/o FF 504). In other words, because the load current to be drawn (e.g., from the DC/DC output capacitors of power supply 301 implemented as a DC/DC converter) is fed forward to adjust inductor current concurrently, the transient current flow on the capacitors will be reduced (e.g., to a minimum). Improving the load transients in this way also reduces voltage transients, as indicated by Equation 4 below:

$$\delta I_{C_{out}} = I_L - I_{load} = C_{out} \frac{dV_{out}}{dt} \quad (4)$$

in which Cout is the output capacitance of power supply 301 and Vout is the output voltage of power supply 301.

The feedforward control circuitry of FIGS. 4A and 4B (particularly in combination with the feedback circuitry shown therein), allows a DC/DC converter current command to be synced with the load change. Even with feedforward circuitry as disclosed, there may still be a voltage drop following a load change because it takes time for the inductor current to build up current (e.g., because the slew rate is limited by inductor voltage and inductance). However, with feedforward circuitry as disclosed, the undershoot or overshoot during a load transient can be reduced or limited (e.g., to the theoretical minimum).

Figure 6:
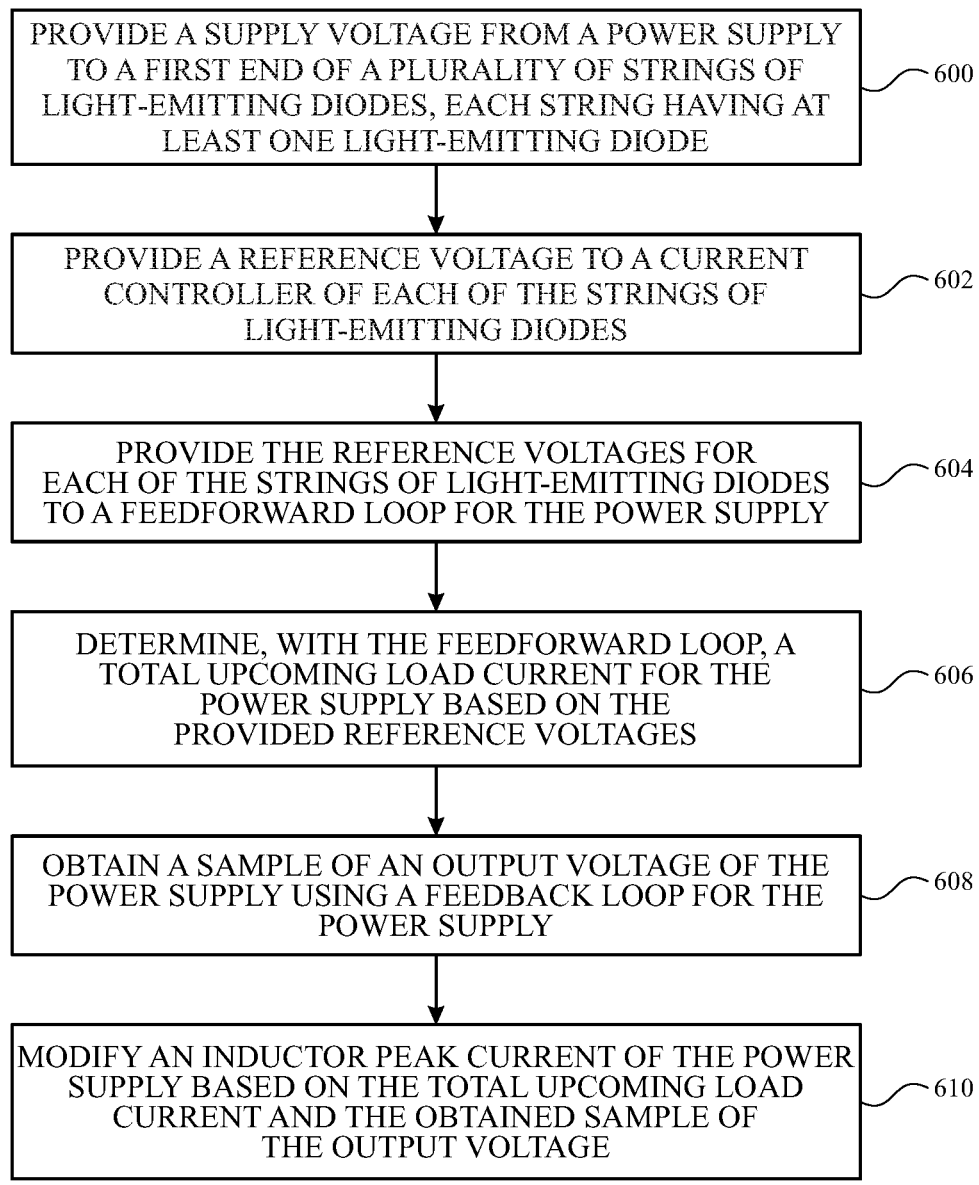
FIG. 6 is a flow chart of illustrative operations that may be performed for load transient response control in accordance with various aspects of the subject technology.

FIG. 6 depicts a flow diagram of an example process for load transient control for a power supply such as a DC/DC converter in accordance with various aspects of the subject technology. For explanatory purposes, the example process of FIG. 6 is described herein with reference to the components of FIGS. 4A and 4B. Further for explanatory purposes, the blocks of the example process of FIG. 6 are described herein as occurring in series, or linearly. However, multiple blocks of the example process of FIG. 6 may occur in parallel. In addition, the blocks of the example process of FIG. 6 need not be performed in the order shown and/or one or more of the blocks of the example process of FIG. 6 need not be performed.

In the depicted example flow diagram, at block 600, a supply voltage is provided from a power supply (e.g., power supply 301 of FIG. 4A such as a DC/DC converter) to a first end of a plurality of strings (e.g., strings 302) of light-emitting diodes (e.g., LEDs 304), each string having at least one light-emitting diode.

At block 602, a reference voltage, such as one of voltages Vref_1-Vref_N of FIGS. 4A and 4B, is provided to a current controller (e.g., amplifiers 313 and transistors 305 of FIGS. 4A and 4B) of each of the strings of light-emitting diodes.

At block 604, the reference voltages for each of the strings of light-emitting diodes are provided to a feedforward loop for the power supply. The feedforward loop may include adder 401, gain circuit 402, adder 404, and/or comparator 314 as described above in connection with FIGS. 4A and 4B.

At block 606, the feedforward loop determines a total upcoming load current (see, e.g., $I_{load}$ of FIG. 4A) for the power supply based on the provided reference voltages.

At block 608, a sample of an output voltage of the power supply is obtained using a feedback loop (see, e.g., sampling line 316, amplifier 308 and Zcomp circuit 306 of FIG. 4A) for the power supply.

At block 610, the inductor peak current of the power supply is modified (e.g., by modifying a PWM input for the power supply using PWM generator 312 of FIG. 4A) based on the total upcoming load current and the obtained sample of the output voltage. Modifying the inductor peak current based on the total upcoming load current and the obtained sample of the output voltage may include applying a gain to the total upcoming load current, to generate a feedforward peak current, adding the feedforward peak current to a feedback peak current determined based on the obtained sample of the output voltage, comparing the combination of the feedforward peak current and the feedback peak current to an inductor current (e.g., the present inductor peak current) of the power supply, and modifying the duty cycle of the PWM input based on the comparison of the combination.

In accordance with various aspects of the subject disclosure, an electronic device having a display with a backlight unit is provided, the backlight unit including a power supply and a plurality of strings of light-emitting diodes configured to receive, at a first end, a supply voltage from the power supply. The backlight unit also includes a current controller at a second end of each string, the current controller operable based on a reference voltage for that string. The backlight unit also includes a feedforward loop configured to modify an output of the power supply based on a combination of the reference voltages.

In accordance with other aspects of the subject disclosure, an electronic device having a display with a backlight unit is provided, the backlight unit including a power supply and a plurality of strings of light-emitting diodes configured to receive, at a first end, a supply voltage from the power supply. The backlight unit also includes a feedback loop for the power supply, the feedback loop configured to sample an output voltage of the power supply. The backlight unit also includes a feedforward loop configured to determine a total upcoming current load for the power supply based on a plurality of reference voltages for the plurality of strings of light-emitting diodes.

In accordance with other aspects of the subject disclosure, a method for operating a display of an electronic device is provided that includes providing a supply voltage from a power supply to a first end of a plurality of strings of light-emitting diodes, each string having at least one light-emitting diode. The method also includes providing a reference voltage to a current controller of each string of the plurality of the strings of light-emitting diodes. The method also includes providing the reference voltages for each of the strings of light-emitting diodes to a feedforward loop for the power supply.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device having a display with a backlight unit, the backlight unit comprising:
   a power supply;
   a plurality of strings of light-emitting diodes configured to receive, at a first end, a supply voltage from the power supply;
   a current controller at a second end of each string, the current controller operable based on a reference voltage for that string; and
   a feedforward loop including first circuitry configured to determine a total load for the power supply based on a combination of the reference voltages, and second circuitry configured to modify an output of the power supply based on the total load.

2. The electronic device of claim 1, wherein the power supply is a DC/DC converter.

3. The electronic device of claim 2, wherein the first circuitry of the feedforward loop comprises an adder to determine a total load current for the DC/DC converter based on the combination of the reference voltages.

4. The electronic device of claim 3, wherein the feedforward loop comprises a gain circuit configured to apply a gain to the determined total load current to generate a peak feedforward current.

5. The electronic device of claim 4, wherein the backlight unit further comprises a feedback loop to obtain a sample of an output voltage of the power supply and determine a peak feedback current based on the obtained sample.

6. The electronic device of claim 5, wherein the feedback loop comprises an operational amplifier configured to compare the sample of the output voltage to an additional reference voltage.

7. The electronic device of claim 1, wherein the backlight unit further comprises an adder to combine the peak feedforward current and the peak feedback current to generate a peak current.

8. The electronic device of claim 1, wherein the second circuitry further comprises a comparator configured to compare the peak current to an inductor current for the power supply.

9. An electronic device having a display with a backlight unit, the backlight unit comprising:
   a power supply;
   a plurality of strings of light-emitting diodes configured to receive a supply voltage from the power supply;
   a feedback loop for the power supply, the feedback loop configured to sample an output voltage of the power supply; and
   a feedforward loop configured to determine a total upcoming current load for the power supply based on a plurality of reference voltages for the plurality of strings of light-emitting diodes.

10. The electronic device of claim 9, the backlight unit further comprising an adder to combine a first current from the feedforward loop and a second current from the feedback loop.

11. The electronic device of claim 10, the feedforward loop comprising:
    an additional adder configured to receive and combine the plurality of reference voltages to generate the total upcoming load current; and
    a gain circuit configured to apply a gain to the total upcoming load current to determine the first current.

12. The electronic device of claim 11, the feedback loop comprising an operational amplifier configured to generate the second current based on a comparison of the sampled output voltage with a reference voltage.

13. The electronic device of claim 12, further comprising a comparator configured to compare an output from the adder with an inductor current of the power supply.

14. The electronic device of claim 13, wherein the power supply is a DC/DC converter.

15. The electronic device of claim 9, wherein each string of the plurality of strings of light-emitting diodes comprises a current control transistor operable based on one of the plurality of reference voltages.

16. A method for operating a display of an electronic device, comprising:
    providing a supply voltage from a power supply to a plurality of strings of light-emitting diodes, each string having at least one light-emitting diode;
    providing a reference voltage to a current controller of each string of the plurality of strings of light-emitting diodes; and
    providing the reference voltages for each of the strings of light-emitting diodes to a feedforward loop for the power supply before providing the reference voltage to the current controller of each string.

17. The method of claim 16, further comprising obtaining a sample of an output voltage of the power supply using a feedback loop for the power supply.

18. The method of claim 17, further comprising modifying a peak current of an inductor of the power supply based on the obtained sample of the output voltage and a current determined by the feedforward loop.

19. The method of claim 18, wherein the current determined by the feedforward loop is a total upcoming load current for the power supply.

20. The method of claim 19, further comprising determining, with the feedforward loop, the total upcoming load current for the power supply, based on the provided reference voltages.

21. The method of claim 20, wherein modifying the peak current of the inductor of the power supply based on the obtained sample of the output voltage and the current determined by the feedforward loop comprises:
   combining a peak feedback current from the feedback loop with a peak feedforward current from the feedforward loop, the peak feedforward current based on the total upcoming load current; and
   comparing an inductor current of the inductor of the power supply with a result of the combining.

* * * * *